(12) United States Patent
Blanc et al.

(10) Patent No.: US 11,465,765 B2
(45) Date of Patent: Oct. 11, 2022

(54) ENGINE PYLON FOR COUPLING A JET ENGINE TO A WING OF AN AIRCRAFT

(71) Applicant: Airbus Operations SAS, Toulouse (FR)

(72) Inventors: Jonathan Blanc, Toulouse (FR); Olivier Pautis, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 172 days.

(21) Appl. No.: 16/933,244

(22) Filed: Jul. 20, 2020

(65) Prior Publication Data

US 2021/0101689 A1 Apr. 8, 2021

Related U.S. Application Data

(60) Provisional application No. 62/880,974, filed on Jul. 31, 2019.

(30) Foreign Application Priority Data

Oct. 17, 2019 (FR) ...................................... 1911640

(51) Int. Cl.
*B64D 27/26* (2006.01)
*B64D 27/18* (2006.01)

(52) U.S. Cl.
CPC ............. *B64D 27/26* (2013.01); *B64D 27/18* (2013.01); *B64D 2027/264* (2013.01)

(58) Field of Classification Search
CPC ... B64D 27/26; B64D 27/18; B64D 2027/264
See application file for complete search history.

(56) References Cited

U.S. PATENT DOCUMENTS

| 6,209,822 | B1* | 4/2001 | Le Blaye | B64D 27/26 244/54 |
| 2008/0217502 | A1* | 9/2008 | Lafont | B64D 27/26 248/554 |
| 2011/0011972 | A1* | 1/2011 | Vache | B64D 27/26 244/54 |
| 2016/0221682 | A1 | 8/2016 | Pautis et al. | |

FOREIGN PATENT DOCUMENTS

FR 2891252 A1 3/2007

* cited by examiner

*Primary Examiner* — Richard R. Green
*Assistant Examiner* — Steven J Shur
(74) *Attorney, Agent, or Firm* — Greer, Burns & Crain, Ltd.

(57) ABSTRACT

An engine pylon for mounting a jet engine beneath a wing of an aircraft, the engine pylon having a primary structure having two internal lateral fittings that face one another and a rib that is fastened between the two internal lateral fittings and a primary box that at least partially surrounds the primary structure and comprises a first part made from a composite material.

13 Claims, 4 Drawing Sheets

[Fig. 1]

[Fig. 3]
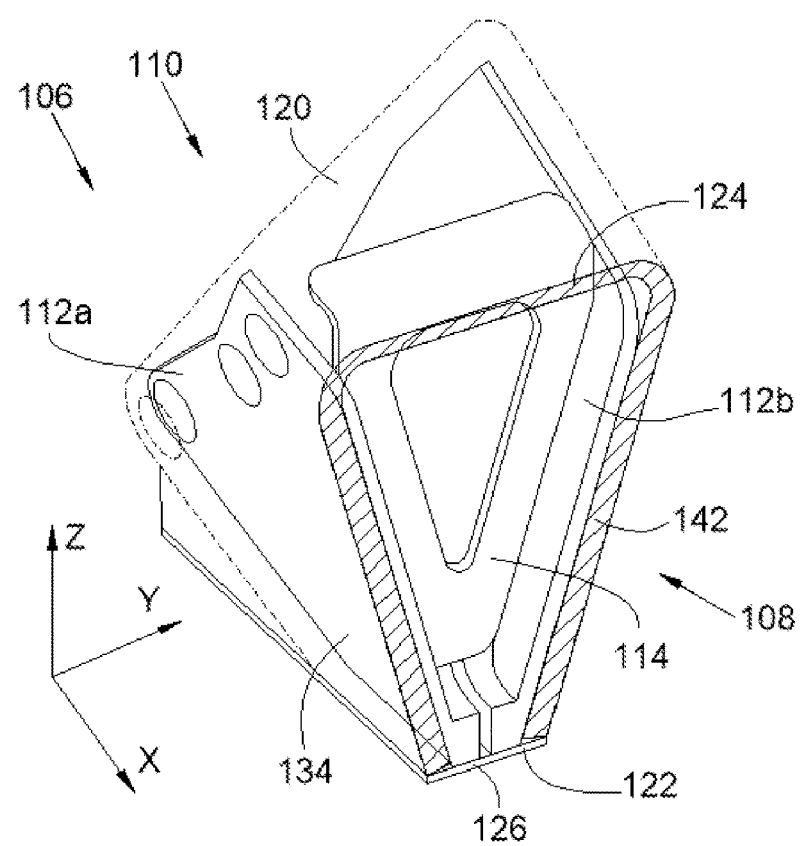
[Fig. 4]
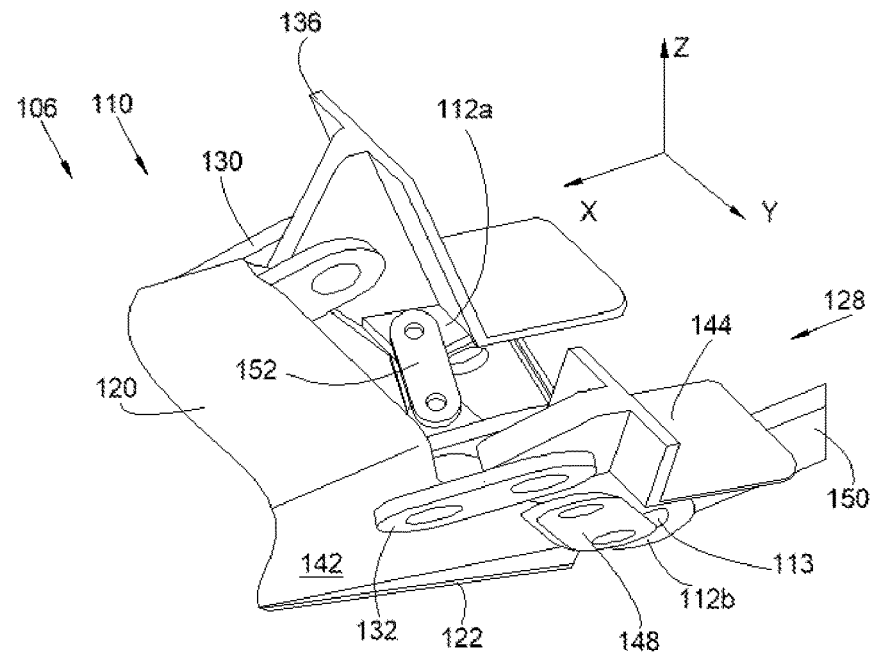

[Fig. 5]
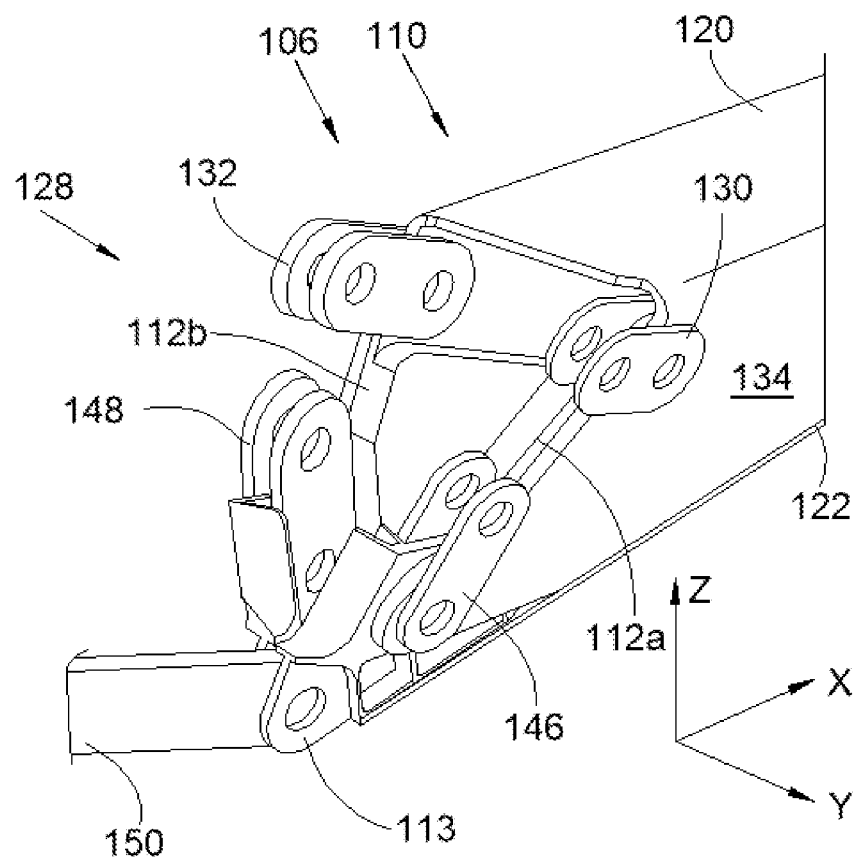
[Fig. 6]
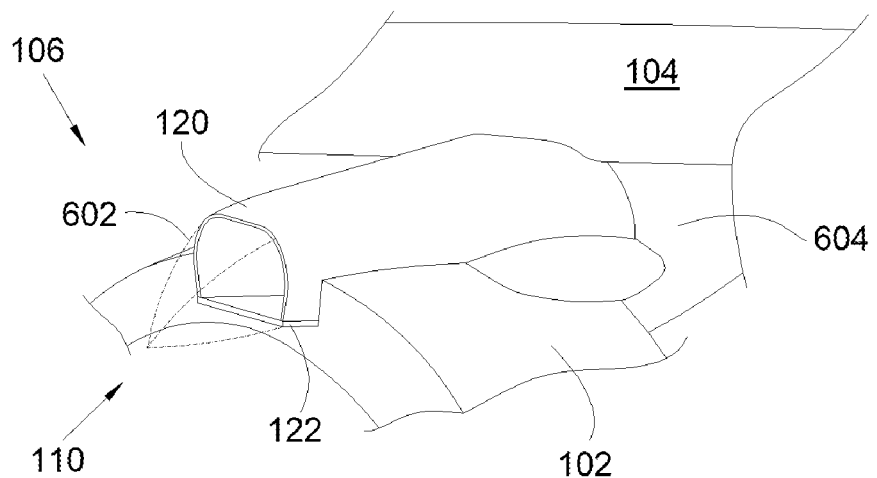

ENGINE PYLON FOR COUPLING A JET
ENGINE TO A WING OF AN AIRCRAFT

RELATED APPLICATIONS

This application claims priority to U.S. patent application Ser. No. 62/880,974 filed on Jul. 31, 2019 and French Patent Application No. 1911640 filed on Oct. 17, 2019, the entireties of both of which are incorporated herein by reference.

TECHNICAL FIELD

The present invention relates to an engine pylon for mounting a jet engine beneath the wing of an aircraft, and to an aircraft having a jet engine, a wing, and such an engine pylon for mounting the jet engine beneath the wing.

BACKGROUND

Usually, for an aircraft, a propulsion assembly has a jet engine that is fastened beneath a wing of the aircraft with the aid of an engine pylon. The engine pylon is generally made up of a primary structure formed of a box made up of an upper spar, a lower spar and two lateral panels connecting the two spars, and internal ribs distributed along the box.

First fastening means fasten the jet engine to the engine pylon. These fastening means conventionally comprise a front engine attachment, a rear engine attachment, and reaction rods that absorb the thrust forces generated by the jet engine.

Second fastening means fasten the engine pylon to the wing. These second fastening means react and absorb the bending moments and the shear loads at the interface of the engine pylon with the wing. An example of such an arrangement is described in the document US-A-2016/0221682.

In conventional designs, the primary box and the primary structure are metallic and have complex shapes. Consequently, the aerodynamic properties of the primary box are generally not optimal because it is difficult to manufacture metallic components (for example titanium components) with complex shapes. It is desirable to provide an engine pylon having more aerodynamic shapes.

In particular, the current second means for fastening between the engine pylon and the wing are satisfactory for the uses currently provided for, but they are not suitable for use with a composite material such as a material made from polymer reinforced with carbon fibers (denoted CFRP for carbon fiber reinforced plastic). In particular, the second fastening means are subjected to loads in a plurality of different and sometimes combined directions, meaning that loads are introduced along a plurality of axes at the same interface point, this entailing the installation of solid fittings in order to withstand these loads.

SUMMARY OF THE INVENTION

According to various embodiments of the present invention, the primary box of the engine pylon is manufactured from a composite material, such as a material made from polymer reinforced with carbon fibers (CFRP). By forming the primary box as a composite structure, the primary box can be manufactured so as to have the desired aerodynamic shapes, in order to limit the drag induced by the engine pylon.

When a component is made from a CFRP material, it is also desirable to provide for the forces that it absorbs to be oriented "out of plane" (forces in a direction transverse to the layers of the CFRP components). As a result, simply changing the materials between a component of the primary box of the prior art and a component made from a CFRP material is not possible.

On account of the use of composite components for the engine pylon, it is possible to use more complex and more aerodynamic shapes for the primary box. In addition, on account of the processes for manufacturing complex composite components, the joining zones/zones for assembling a multi-component joint may be eliminated. Furthermore, the use of the composite also makes it easier to produce more complex shapes of the wing type (such as double curves), which shapes may not be able to be produced with hard metal components, or may be obtained only with expensive manufacturing processes.

The other advantages obtained by using composite components include: a significant increase in the working section (or inertia) of the primary structure; reduction in the mass and costs of the structural elements; increase in the interior volume to make it possible to install and integrate modular systems (that are pre-equipped/pre-cabled, etc.); an optimal external shape for aerodynamic optimization of the aerodynamic performance of the secondary air duct of the jet engine; an integrated structure making it possible to eliminate the splicing zones needed for assembling a multi-component structure; and a reduction in costs without needing to drill/bore and assemble a plurality of components.

Therefore, it is an object of the present invention to propose an engine pylon that has at least one external part made from a composite material that makes it possible to produce complex shapes.

To this end, an engine pylon for mounting a jet engine beneath a wing of an aircraft is proposed, the engine pylon having a primary structure having two internal lateral fittings that face one another and a rib that is fastened between the two internal lateral fittings; and a primary box that at least partially surrounds the primary structure and comprises a first part made from a composite material.

With such an engine pylon, it is then possible to obtain complex shapes for the primary structure.

Advantageously, in a plane perpendicular to a longitudinal axis of the engine pylon, the first part has an inverted U-shaped section, with two lateral walls that are connected by an upper side.

Advantageously, the primary box has a second part extending against the free ends of the two lateral walls, and, in the plane perpendicular to the longitudinal axis of the engine pylon, the primary box has a trapezoidal section.

Advantageously, in the plane perpendicular to the longitudinal axis of the engine pylon, the upper side is longer than the second part.

Advantageously, the engine pylon has a first and a second set of upper shackles, the first set of upper shackles fastens, in use, a first lateral wall of the first part of the primary box and a first internal lateral fitting to a structural element of the wing, and the second set of upper shackles fastens, in use, a second lateral wall of the first part of the primary box and a second internal lateral fitting to a structural element of the wing.

Advantageously, the upper shackles of the first and the second sets of upper shackles are oriented with an inclination of between 0° and 45° relative to a purely horizontal axis, and preferably they are oriented more or less horizontally.

Advantageously, the shackles of the first and the second sets of upper shackles are each aligned in the continuation of the first and the second lateral walls, respectively, of the first part of the primary box.

Advantageously, the engine pylon has a first and a second set of lower shackles, the first set of lower shackles fastens, in use, the first lateral wall of the first part of the primary box and the first internal lateral fitting to a structural element of the wing, and the second set of lower shackles fastens, in use, the second lateral wall of the first part of the primary box and the second internal lateral fitting to a structural element of the wing.

Advantageously, the lower shackles of the first and the second sets of lower shackles are oriented with an inclination of between 0° and 30° relative to a purely vertical axis, and preferably more or less vertically.

Advantageously, the shackles of the first and the second sets of lower shackles are each aligned in the continuation of the first and the second lateral walls, respectively, of the first part of the primary box.

Advantageously, in a rear zone, the two internal lateral fittings form a rear clevis, and the engine pylon has a rear rod connecting, in use, the rear clevis to the wing.

Advantageously, the engine pylon has a transverse shackle that is oriented in a transverse direction of the engine pylon and connects an internal lateral fitting to the wing, wherein a line connecting centers of two apertures in the transverse shackle is oriented transversely relative to the longitudinal axis of the engine pylon.

According to one particular embodiment, the engine pylon has an outer cowling that is in the shape of an inverted U and covers the primary box.

According to another particular embodiment, the first part has aerodynamic shapes, and the engine pylon has a front cowling that extends the first part towards the front, and a rear cowling that extends the first part towards the rear.

The invention also proposes an aircraft having a wing, a jet engine and an engine pylon according to one of the preceding variants, fastened between the wing and the jet engine.

Other aspects, embodiments and details of the invention, which may all be combined in any manner whatsoever, are set out in the detailed description of the invention below.

BRIEF DESCRIPTION OF THE DRAWINGS

The abovementioned features of the invention, along with others, will become more clearly apparent on reading the following description of an exemplary embodiment, said description being given with reference to the appended drawings, in which:

FIG. 3 shows a partially transparent perspective and cross-sectional view, seen from below and the front, of the engine pylon according to the invention, wherein the cross section corresponds to a cross section on the plane III in FIG. 2, FIG. 4 shows a perspective view of the engine pylon according to the invention, FIG. 5 shows a perspective top and rear view of the engine pylon according to the invention, and FIG. 6 shows a perspective view of the engine pylon according to the invention, equipped with an aerodynamic surface.

DETAILED DESCRIPTION OF EMBODIMENTS

Figure 1:
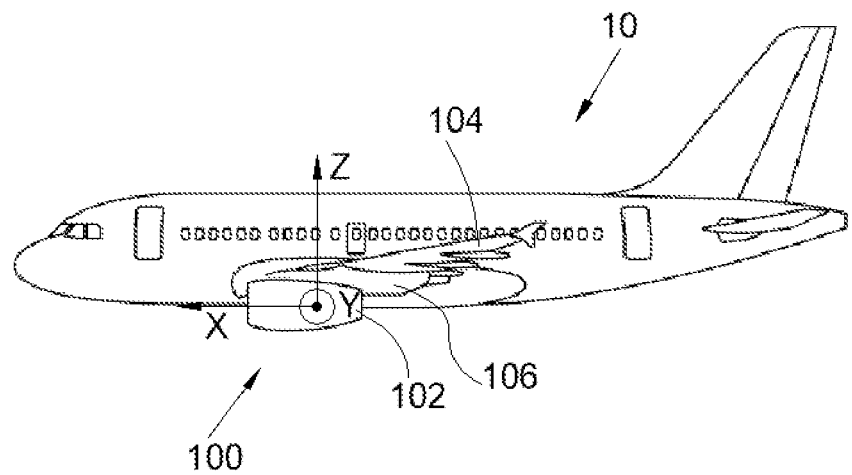
FIG. 1 is a side view of an aircraft according to the invention.

FIG. 1 shows an aircraft 10, which has a propulsion system 100 with a jet engine 102 fastened to a wing 104 of the aircraft 10 by way of an engine pylon 106 according to the invention.

In the following description, terms relating to a position are considered in relation to an aircraft in a normal flight position, i.e. as shown in FIG. 1, and the "front" and "rear" positions are considered in relation to the front and the rear of the jet engine and in relation to the direction of forward movement of the aircraft 10 when the jet engine 102 is in operation.

In the following description, and by convention, the X direction is the longitudinal direction of the jet engine, which is parallel to the longitudinal axis of said jet engine, the Y direction is the transverse direction, which is horizontal when the aircraft is on the ground, and the Z direction is the vertical direction, which is vertical when the aircraft is on the ground, these three directions X, Y and Z being mutually orthogonal.

The jet engine 102 has a shape exhibiting symmetry of revolution about its longitudinal axis.

As shown in FIG. 3, the engine pylon 106 comprises a rigid structure 108, also referred to as the primary structure, surrounded by a primary box 110 (shown as transparent by way of dot-dashed lines). The primary structure 108 is formed of a set of two internal lateral fittings 112*a-b* that face one another and at least one rib 114 that extends between the two internal lateral fittings 112*a-b*, wherein each rib 114 is fastened between the two internal lateral fittings 112*a-b*.

The set of internal lateral fittings 112*a-b* is made up of a first internal lateral fitting 112*a* that is on the starboard side relative to the axis of the jet engine 102 and a second internal lateral fitting 112*b* that is on the port side relative to the axis of the jet engine 102.

The internal lateral fittings 112*a-b* and the ribs 114 may be made from metal or from composite materials.

The primary box 110 has a first lateral wall 134 and a second lateral wall 142. The first lateral fitting 112*a* and the first lateral wall 134 adjoin one another, forming a starboard-side lateral wall, and the second lateral fitting 112*b* and the second lateral wall 142 adjoin one another, forming a port-side lateral wall.

Each rib 114 extends between the two lateral panels in a plane that is generally normal to the longitudinal direction X.

Figure 2:
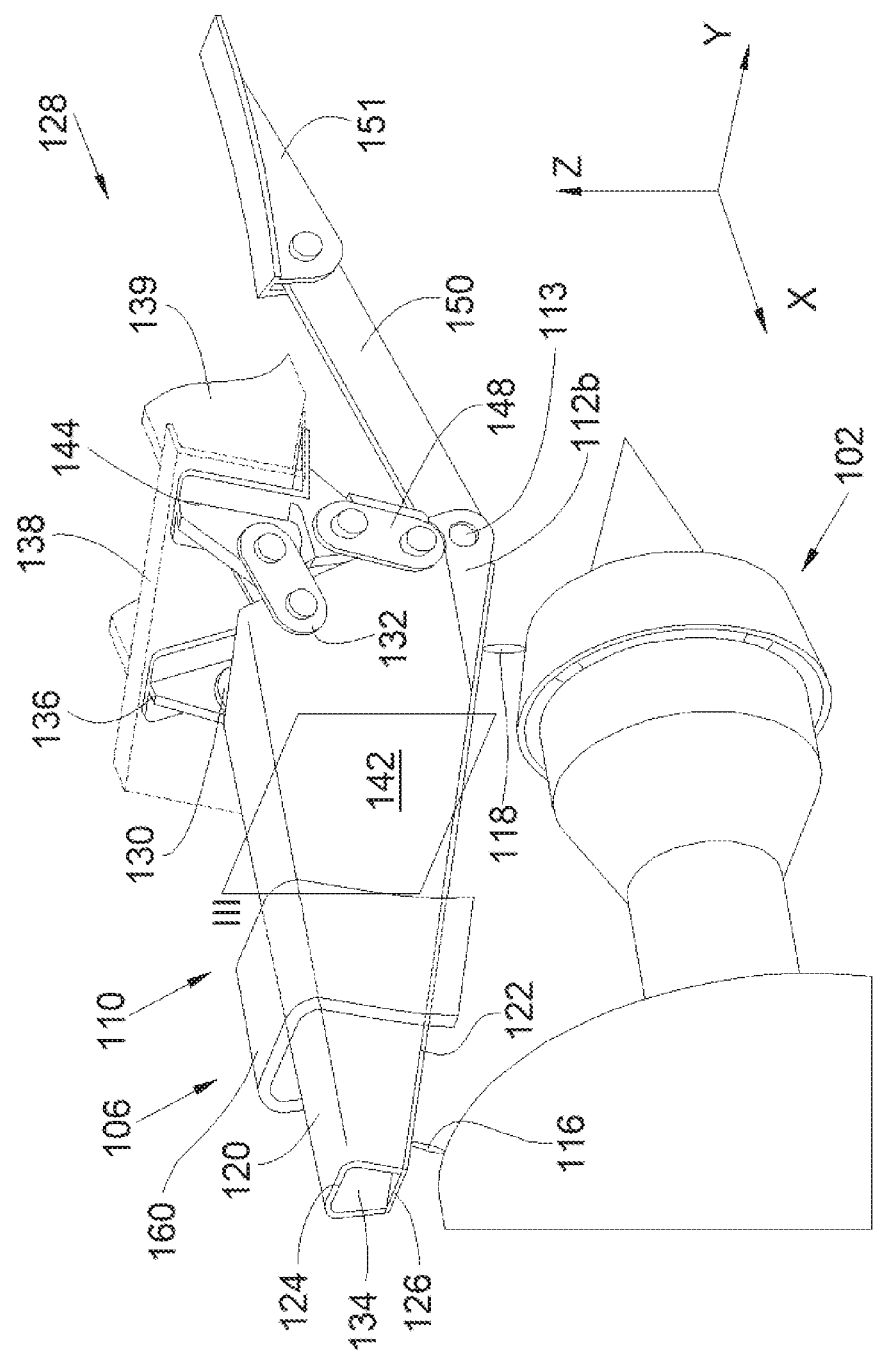
FIG. 2 is a perspective front and side view of a jet engine fastened to a wing by an engine pylon according to the invention.

With reference to FIG. 2, the primary structure 108 supports the jet engine 102 by way of first fastening means (not illustrated) that are depicted here by points 116 at the front and 118 at the rear. The first fastening means may be of conventional design, such as those disclosed in the document US-A-2016/0221682.

With reference to FIG. 3, the primary box 110 delimits an interior volume in which the primary structure 108 is at least partially housed. In the embodiment proposed here, the primary box 110 comprises a first part 120 and a second part 122, which together at least partially surround the primary structure 108.

In a plane perpendicular to a longitudinal axis of the engine pylon 106 extending in the X direction and parallel to the longitudinal axis of the jet engine 102, the first part 120 has a transverse cross section YZ with an inverted U shape, i.e. one that is open towards the bottom. In other words, viewed along the longitudinal axis of the engine pylon 106, the first part 120 has an inverted U shape. Each leg of the U forms a lateral wall 134, 142 of the first part 120 of the primary box 110.

The second part 122 is situated against the free ends of the two legs of the inverted U so as to close the interior volume between the legs of the U.

The primary structure 108, i.e. the internal lateral fittings 112a-b that face one another and the ribs 114, is housed in the first part 120, i.e. in the inverted U, and the second part 122 closes the first part 120 by enclosing the primary structure 108.

When the first part 120 and the second part 122 are fastened to one another, the primary box 110 has, in the plane perpendicular to the longitudinal axis of the engine pylon 106, a trapezoidal transverse cross section YZ. In other words, when it is viewed along the longitudinal axis of the engine pylon 106, the primary box 110 has a trapezium shape. The inverted U-shaped profile thus has closed angles, i.e. acute angles, at the connection between the legs of the U and the bottom of the U.

With respect to the orientation in FIG. 3, the upper side 124 of the trapezium and the lower side 126 are the parallel sides of the trapezium and extend parallel to the transverse direction Y, i.e. in the plane perpendicular to the longitudinal axis of the engine pylon 106. In this orientation, the upper side 124 is longer than the lower side 126. The upper side 124 corresponds to the bottom of the U and the lower side 126 corresponds to the second part 122. The upper side 124 connects the two lateral walls 134 and 142 that make up the inverted U so as to form the first part 120 of the primary box 110 that is in the shape of an inverted U.

At least the first part 120 of the primary box 110 is made up of a monolithic structure made from composite materials, such as CFRP. In order to use a CFRP material, it is desirable for the engine pylon 106 to be coupled between the jet engine 102 in a manner that ensures that no out-of-plane load is introduced into the port-side and starboard-side lateral walls made up of the lateral walls 134 and 142 of the primary box 110 and the internal lateral fittings 112a-b, and for all the loads introduced to be broken down into six introductions of unidirectional and independent loads that are aligned with the neutral axes of the elements making up the connecting zone and of all the components manufactured from CFRP materials, such as the wing 104 or the engine pylon 106.

FIGS. 2, 4 and 5 show a joining system 128 of the engine pylon 106 that fastens the engine pylon 106 to the wing 104 and comprises a first and a second set of upper shackles or links 130, 132, and that provides a double shear joint/connection. In addition, it should be understood that, although it is not shown, a pin or some other structure extends through the openings in the various elements in order to join the elements together.

In use, the first set of upper shackles 130 fastens the first lateral wall 134 of the first part 120 of the primary box 110 and the first internal lateral fitting 112a, i.e. the starboard-side lateral wall, to a first support 136 fastened to a structural element 138 of the wing 104 (see FIG. 2), such as the front spar of the wing 104.

In use, the second set of upper shackles 132 fastens the second lateral wall 142 of the first part 120 of the primary box 110 and the second lateral fitting 112b, in this case the port-side lateral wall, to a second support 144 that is also fastened to the structural element 138 of the wing 104.

The shackles of the sets of upper shackles 130, 132 are oriented on the XZ plane and each of them is aligned with a core of a rib 139 of the wing 104 and one of the lateral walls 134, 142 of the first part 120 of the engine pylon 106. More specifically, the shackles of the sets of upper shackles 130, 132 that are more or less horizontal extend parallel to one of the lateral walls 134, 142 of the first part 120, and, more specifically, are aligned with and in the continuation of one of the lateral walls 134, 142 of the first part 120.

The first support 136 is disposed on the starboard side and the second support 144 is disposed on the port side with respect to the axis of revolution of the turbomachine 102 and the direction of movement of the aircraft 10 towards the front.

The upper shackles of the first and the second sets of upper shackles 130, 132 are oriented more or less horizontally, meaning that the line connecting the two centers of the apertures in a single upper shackle is more or less horizontal. Nevertheless, these upper shackles 130 and 132 could be oriented with an inclination of between 0° and 45° relative to a purely horizontal axis.

In addition, the joining system 128 comprises a first and a second set of lower shackles 146, 148. In addition, it should be understood that, although it is not shown, a pin or some other structure extends through the openings in the various elements in order to join the elements together.

In use, the first set of lower shackles 146 fastens the first lateral wall 134 of the first part 120 of the primary box 110 and the first internal lateral fitting 112a, i.e. the starboard-side lateral wall, to the first support 136.

In use, the second set of lower shackles 148 fastens the second lateral wall 142 of the first part 120 of the primary box 110 and the second internal lateral fitting 112b, i.e. the port-side lateral wall, to the second support 144.

The lower shackles 146 and 148 are oriented in the Z direction and aligned with the core of the front spar 138 of the wing 104 and one of the lateral walls 134, 142 of the first part 120 of the engine pylon 106. More specifically, the lower shackles 146, 148 extend parallel to one of the lateral walls 134, 142 of the first part 120, and, more specifically, are aligned with and in the continuation of one of the lateral walls 134, 142 of the first part 120.

The lower shackles of the first and the second sets of lower shackles 146, 148 are oriented more or less vertically, meaning that the line connecting the two centers of the apertures in a single lower shackle is more or less vertical. Nevertheless, these lower shackles 146 and 148 could be oriented with an inclination of between 0° and 30° relative to a purely vertical axis.

In a rear and lower zone, the two internal lateral fittings 112a-b meet and form a rear clevis 113.

The joining system 128 also comprises a rear rod 150 that connects, in use, the rear clevis 113 to the wing 104 and is oriented on the XZ plane.

The rear rod 150 has a first end mounted in an articulated manner on the rear clevis 113 and a second end mounted in an articulated manner on a shoe 151 fastened to the wing 104, in particular at the pressure-side panel of the wing 104.

The longitudinal direction of the rear rod 150, i.e. the line connecting the centers of the two articulations of said rear rod 150, is generally tangential to the pressure-side panel at the fastening to the wing 104, i.e. at the shoe 151. On the other hand, in order to safeguard against cases of breaking and propagation (known as "failure mode"), the rear rod 150 may be made up of two cores that are separate but are connected to one another by a conventional bolting system (not described in detail here) so as to form only one component working according to the various cases and loading conditions. According to another embodiment, the rear rod 150 may be doubled by another independent rod that is connected in the same way.

The joining system 128 also comprises a transverse shackle 152 that is oriented in a transverse direction Y of the engine pylon 106 and connects an internal lateral fitting (in this case the first internal lateral fitting 112a) of the engine pylon 106 to the support 136, 144 that is on the opposite side.

The transverse shackle 152 is oriented in the Y direction, i.e. transversely relative to the longitudinal axis of the engine pylon 106. In the embodiment in FIG. 5, the transverse shackle 152 is fastened between the port-side lateral panel and the first support 136 on the starboard side. The transverse shackle 152 is aligned with the core of the pressure-side panel of the wing 104. The line connecting the two centers of the apertures in the transverse shackle 152 is oriented transversely relative to the longitudinal axis of the engine pylon 106.

Consequently, with such a joining system 128, the reaction of the bending moment about the Z axis, referred to as "Mz", is ensured by the combined loading of the two upper shackles 130 and 132 and of the transverse shackle 152, the reaction of the torsional moment about the X axis, referred to as "Mx", is ensured by the combined loading of the two lower shackles 146, 148 and of the transverse shackle 152, and finally, the reaction of the bending moment about the Y axis, referred to as "My", is ensured by the combined loading of the upper shackles 130, 132, of the rear rod 150 and of the lower shackles 146, 148.

An advantage of the joining system 128 with this particular arrangement is that the primary structure 108 of the engine pylon 106 has a unidirectional load at each of the six introductions of load, i.e. at each shackle, in order to react independently in the six degrees of freedom, this giving a statically determined joining system.

Thus, it is easier to align each shackle 130, 132, 146, 148 (or set of shackles for the double shear joint) with the neutral axes of the surrounding structural components that are manufactured from CFRP materials, such as the wing 104 and the other components of the engine pylon 106. Thus, the joining system 128 ensures that no out-of-plane load is introduced into the components formed from CFRP materials such as the engine pylon 106 and the wing 104. In other words, any introduction of loads is broken down into introductions of unidirectional and independent loads and is aligned with neutral axes of the components manufactured from CFRP materials.

In this way, the primary structure 108 of the engine pylon is subjected to a unidirectional load at each of the six introductions of load, in order to react independently in the six degrees of freedom, this giving a statically determined system that is referred to as "isostatic".

According to a particular embodiment, the shackles 130, 132, 146 and 148 are made from a CFRP material. In the case of CFRP materials, unlike metal, there is no crack propagation, fatigue or ageing.

The joining system 128 also makes it possible to eliminate an overhanging arm that generates a secondary bending moment on the interface joining fittings. This arrangement provides fittings for joining to the wing 104 that are simple and compact, resulting in savings in terms of weight and recurring costs.

The other advantages include the ability to use the integration of the components and boxes made from a CFRP material into the two components (the engine pylon 106 and the wing 104), and this, as shown above, makes a more aerodynamic shape possible and has other advantages. In addition, with the upper shackles 130, 132 situated in the region of the leading edge of the wing 104, there is a wider zone allowing a larger lever arm and thus making it possible to reduce the load levels.

In the embodiment of the invention that is presented in FIG. 2, the engine pylon 106 has an outer cowling 160 that covers the primary box 110. The outer cowling 160 has the shape of an inverted U that has aerodynamic shapes in order to ensure a good flow of air around the engine pylon 106. In FIG. 2, for visibility reasons, only a part of the outer cowling 160 has been shown, but said outer cowling extends beyond the front and the rear of the primary box 110. The outer cowling 160 is in this case made from a composite material.

FIG. 6 shows a particular embodiment, in which the first part 120 has aerodynamic shapes in order to ensure a good flow of air around the engine pylon 106, these aerodynamic shapes being easy to produce in the case of a composite material. In FIG. 6, the joining system 128 has not been shown.

The engine pylon 106 in this case has a front cowling 602 that is depicted here by way of dot-dashed lines and extends the first part 120 towards the front. The front cowling 602 also has aerodynamic shapes and is made from composite materials such as from CFRP, for example, to make it possible to produce complex shapes.

The engine pylon 106 in this case has a rear cowling 604 that extends the first part 120 towards the rear. The rear cowling 604 also has aerodynamic shapes and is made from composite materials such as from CFRP, for example.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An engine pylon for mounting a jet engine beneath a wing of an aircraft, the engine pylon comprising:
   a primary structure having two internal lateral fittings that face one another and a rib that is fastened between the two internal lateral fittings;
   a primary box that at least partially surrounds the primary structure and comprises a first part made from a composite material, wherein in a plane perpendicular to a longitudinal axis of the engine pylon, the first part has an inverted U-shaped section, with two lateral walls that are connected by an upper side so that the first part forms a monolithic structure;
   a first and a second set of upper shackles, wherein the first set of upper shackles fastens, in use, a first lateral wall of the first part of the primary box and a first internal lateral fitting to a structural element of the wing, and in that the second set of upper shackles fastens, in use, a second lateral wall of the first part of the primary box and a second internal lateral fitting to a structural element of the wing; and, a first and a second set of lower shackles, wherein the first set of lower shackles fastens, in use, the first lateral wall of the first part of the primary box and the first internal lateral fitting to a structural element of the wing, and in that the second set of lower shackles fastens, in use, the second lateral wall of the first art of the primary box and the second internal lateral fitting to a structural element of the wing, wherein the first set of lower shackles are parallel with the first lateral wall of the first part of the primary box and the second set of lower shackles are parallel with the second lateral wall of the first part of the primary box.

2. The engine pylon according to claim 1, wherein the primary box has a second part extending against free ends of the two lateral walls, and wherein, in the plane perpendicular to the longitudinal axis of the engine pylon, the primary box has a trapezoidal section.

3. The engine pylon according to claim 2, wherein in the plane perpendicular to the longitudinal axis of the engine pylon, the upper side is longer than the second part.

4. The engine pylon according to claim 1, wherein the upper shackles of the first and the second sets of upper shackles are oriented with an inclination of between 0° and 45° relative to a purely horizontal axis, and preferably they are oriented more or less horizontally.

5. The engine pylon according to claim 1, wherein the upper shackles of the first and the second sets of upper shackles are each aligned in a continuation of the first and the second lateral walls, respectively, of the first part of the primary box.

6. The engine pylon according to claim 1, wherein the lower shackles of the first and the second sets of lower shackles are oriented with an inclination of between 0° and 30° relative to a purely vertical axis.

7. The engine pylon according to claim 1, wherein in a rear zone, two internal lateral fittings form a rear clevis, and wherein the engine pylon has a rear rod connecting, in use, the rear clevis to the wing.

8. The engine pylon according to claim 1, wherein the engine pylon has a transverse shackle that is oriented in a transverse direction of the engine pylon and connects, in use, an internal lateral fitting to the wing, and wherein a line connecting centers of two apertures in the transverse shackle is oriented transversely relative to a longitudinal axis of the engine pylon.

9. The engine pylon according to claim 1, wherein the engine pylon further comprises has an outer cowling having a shape of an inverted U and which covers the primary box.

10. The engine pylon according to claim 1, wherein the first part has aerodynamic shapes, and wherein the engine pylon has a front cowling that extends the first part towards a front of the engine pylon, and a rear cowling that extends the first part towards a rear of the engine pylon.

11. An aircraft comprising:
a wing,
a jet engine, and
the engine pylon according to claim 1 fastened between the wing and the jet engine.

12. The engine pylon according to claim 1, wherein the upper shackles of the first and the second sets of upper shackles are oriented more or less horizontally.

13. The engine pylon according to claim 1, wherein the lower shackles of the first and the second sets of lower shackles are oriented more or less vertically.

\* \* \* \* \*